Nov. 2, 1965 F. P. LOOTS 3,215,554

SUBBING LAYER FOR MAGNETIC RECORDING MATERIALS

Filed Jan. 21, 1963

INVENTOR
Francois P. Loots,

BY Watson, Cole, Grindle + Watson
ATTORNEYS

United States Patent Office 3,215,554

Patented Nov. 2, 1965

3,215,554

SUBBING LAYER FOR MAGNETIC RECORDING MATERIALS

Francois Pierre Loots, Mortsel-Antwerp, Belgium, assignor to Gevert Photo-Producten N.V., Mortsel-Antwerp, Belgium, a company of Belgium Filed Jan. 21, 1963, Ser. No. 252,590
Claims priority, application Netherlands, Jan. 22, 1962, 273,831; Belgium, May 7, 1962, 41,627, Patent 617,295
2 Claims. (Cl. 117—76)

Figure 1:
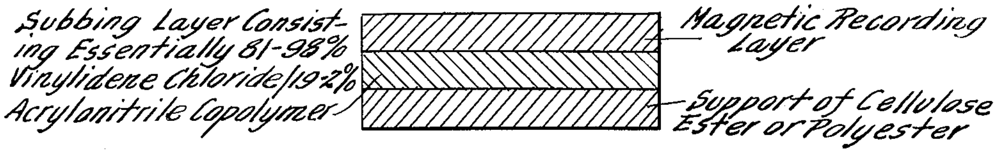

This invention relates to a magnetic recording material and more especially to a subbing layer for the anchorage of the magnetic recording layer and other coatings to the support.

Most of the usual magnetic recording materials consist of a flexible support to which a magnetically susceptible layer has been applied.

Plastic materials which come into account for the manufacture of such support are, e.g., cellulose esters, such as cellulose diacetate, cellulose triacetate, polymers such as polyvinyl chloride, and polyesters such as polycarbonates and polyethylene terephthalate. These plastic materials can be worked up to a support by coating from a solution, by calendering or by extrusion from the melt occasionally followed by stretching.

The magnetic layer can be applied to such a support in different ways, e.g., by vacuum deposition, by electrolytic metalizing or by coating onto the support a dispersion containing magnetically susceptible particles. Where the production of magnetic material is concerned for recording of sound and video signals, the latter process is the most applied.

According to the latter process, a ferromagnetic pigment, mostly $\gamma$-ferric oxide, is dispersed in a solution of a film-forming synthetic resin in a volatile solvent. This dispersion is then coated onto a support. Hitherto, the most diversified synthetic resins were used as binding agents for ferromagnetic pigments, e.g., polyvinyl chloride, polystyrene and others such as those described in the British patent specification 676,761.

In some cases the support repels the binding agent of the recording layer, and notwithstanding the use of all kinds of combinations of solvents, the recording layer cannot be fixed to the support. Some binding agents, although possessing by nature an insufficient adhering power to the support, can, however, present physical advantages as binding agents for magnetic susceptible recording layers containing ferromagnetic pigments. Hence, it has been tried to use these advantages. For this purpose a subbing layer has to be applied in many cases between the magnetic layer and the support. A same requirement can be made, when applying other layers to magnetic recording materials, e.g., when applying matte back layers, sandwich layers, covering layers and adhesive layers, for film stripping.

It has now been found that a layer comprising a copolymer of vinylidene chloride and acrylonitrile consisting of from 81 to 98% of vinylidene chloride units, possesses a great adhesion power for the usual materials from which the supports of magnetic recording materials are made, and hence can be used as a subbing layer for fixing thereon another layer having affinity for said subbing layer, e.g., a magnetic recording layer, an intermediate layer, a back layer or an adhesive layer.

Figure 2:
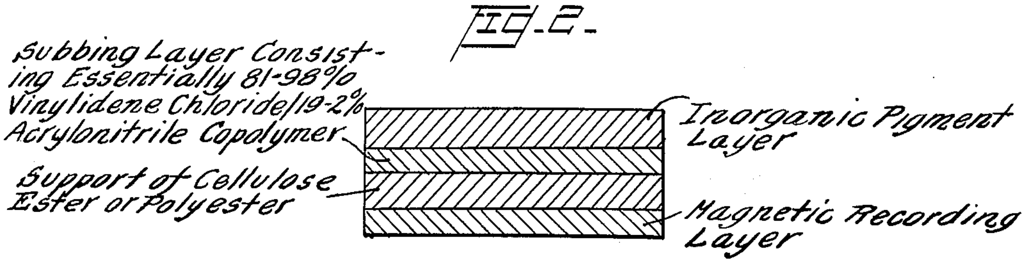

Two embodiments of the concept of the present invention are schematically illustrated in the drawing accompanying the present application wherein:

FIG. 1 illustrates the use of the subbing layer of the invention between the magnetic recording layer and the support; and FIG. 2 illustrates the use of such subbing layer between a molecular pigment layer and the support, the magnetic recording layer being disposed on the reverse side of the support.

The mentioned copolymer is soluble in a whole series of solvents such as ketones, chlorinated hydrocarbons, mixtures of esters and ketones and mixtures of esters and chlorinated hydrocarbons. Supports for which this copolymer shows a very good adhesion, are made from cellulose esters such as cellulose triacetate and from polyesters such as polyethylene terephthalate. The kind of layer which by means of the subbing layer described hereinbefore can be adhered to the support, is very divergent. This layer occasionally may contain magnetic or other pigments or consist of magnetic susceptible metal which has been applied, e.g., by vacuum deposition. The layer which is fixed to the support, however, preferably consists of at least one compound, mentioned as binding agent for magnetic particles in the British patent specification 676,761, or of one of the binding agents mentioned in the German patent specification 814,225 and the Belgian patent specification 612,896.

Preferably the application of the subbing layer is performed from a solution of the above copolymer in one of the mentioned types of solvents or mixtures of solvents, e.g., methyl isobutyl ketone, dioxan or tetrahydrofuran. The subbing layer may be applied by known film-casting methods, or by spreading on roller coating. After drying the subbing layer, the layer which has to be anchored to the base material is applied thereon. An after-treatment by heat can be advantageous to improve the anchorage. Further, it may be advantageous to add a surface active agent to the coating solution containing the mentioned copoly(vinylidene/acrylonitrile), in order to improve the wetting of the support by the coating composition of the subbing layer. For this purpose, preferably higher saturated or unsaturated aliphatic amides are used such as 9-octadecane amide or 9-octadecene amide.

*Example 1*

Onto a cellulose triacetate support of 35$\mu$ thickness a subbing layer is coated from the following solution:

| | | |
|---|---|---|
| Copoly(vinylidene chloride/acrylonitrile) a 20% solution in acetone of which has a viscosity of 200 cp. at 24° C. | g. | 2.5 |
| Methyl isobutyl ketone | cc. | 100 |

Said subbing layer is coated in such a way that each liter covers 40 sq. m.

After evaporating the solvent a magnetic layer is coated onto this subbing layer from the following dispersion:

| | | |
|---|---|---|
| $\gamma$-Iron (III) oxide | g. | 30 |
| After-chlorinated poly(vinyl chloride) a 10% solution in acetone of which has a viscosity of 22 cp. at 24° C. | g. | 10 |
| Toluene | cc. | 350 |
| Methyl isobutyl ketone | cc. | 350 |

This layer is applied in such a way that after drying a magnetic layer is obtained of 12$\mu$ thickness.

This layer is very strongly anchored to the support by the presence of the subbing layer.

*Example 2*

Onto a poly(ethylene terephthalate) support of 25$\mu$ thickness a subbing layer is coated from the following solution:

| | | |
|---|---|---|
| Copoly(vinylidene chloride/acrylonitrile) a 20% solution in acetone of which has a viscosity of 200 cp. at 24° C. | g. | 2.5 |
| Ethyl acetate | cc. | 50 |
| Acetone | cc. | 50 |

Said subbing layer is coated in such a way that each liter covers 40 sq. m.

After evaporating the solvent a magnetic layer is coated onto said subbing layer from the following dispersion:

| | |
|---|---|
| γ-Iron (III) oxide ______ g. | 30 |
| After-chlorinated poly(vinyl chloride) a 10% solution in acetone of which has a viscosity of 22 cp. at 24° C. ______ g. | 10 |
| Toluene ______ cc. | 350 |
| Methyl isobutyl ketone ______ cc. | 350 |

This layer is applied in such a way that after drying a magnetic layer is obtained of 10μ thickness.

The magnetic layer is very strongly anchored to the support by the presence of the subbing layer.

*Example 3*

A magnetic tape having a cellulose triacetate support is coated at its back side with a subbing layer from the following solution:

| | |
|---|---|
| Copoly(vinylidene chloride/acrylonitrile) a 20% solution in acetone of which has a viscosity of 60 cp. at 24° C. ______ g. | 2.5 |
| Mixture of higher aliphatic amides having the following composition: 91% of 9-octadecene amide, 6% of octadecane amide, 3% of 9,12-octadecadiene amide ______ g. | 0.25 |
| Methyl isobutyl ketone ______ cc. | 100 |

Said subbing layer is coated in such a way that each liter covers 40 sq. m.

Onto said layer a matte pigment layer is coated from the following composition:

| | |
|---|---|
| Diatomaceous earth ______ g. | 40 |
| Litharge ______ g. | 6 |
| TOBITHOLROOD B (trade name for a red pigment) ______ g. | 14 |
| Titanium dioxide ______ g. | 10 |
| Chlorosulfonated polyethylene ______ g. | 25 |
| Methyl isobutyl ketone ______ cc. | 200 |

in such a way that each liter covers 20 sq. m.

By the presence of this subbing layer the pigment layer is very strongly anchored to the support.

We claim:

1. A magnetic recording material comprising a support selected from the group consisting of polyesters and cellulose esters, a magnetic recording layer consisting essentially of finely divided magnetic particles in a hydrophobic synthetic resinous binder, and a subbing layer for adhering said recording layer to said support, said subbing layer consisting essentially of a vinylidene chloride-acrylonitrile copolymer having about 81–98% vinylidene chloride units.

2. A magnetic recording material comprising a support selected from the group consisting of polyesters and cellulose esters, a pigment layer consisting essentially of non-magnetic finely divided inorganic pigment in a hydrophobic synthetic resinous binder, a subbing layer for adhering said pigment layer to one side of said support, and a magnetic recording layer on the other side of said support, said magnetic recording layer consisting essentially of finely divided magnetic particles in a hydrophobic resin binder, said subbing layer consisting essentially of a vinylidene chloride-acrylonitrile copolymer having about 81–98% vinylidene chloride units.

References Cited by the Examiner

UNITED STATES PATENTS

| | | | |
|---|---|---|---|
| 2,627,088 | 2/53 | Alles et al. | |
| 2,698,240 | 12/54 | Alles et al. | 117—76 |
| 2,779,684 | 1/57 | Alles | 117—138.8 |
| 2,782,043 | 2/57 | Andrews. | |
| 2,804,401 | 8/57 | Cousino. | |
| 2,819,186 | 1/58 | Franck | 117—138.8 |
| 2,824,025 | 2/58 | McIntyre | 117—138.8 |
| 2,925,356 | 2/60 | Sapper | 117—138.8 |
| 3,021,229 | 2/62 | Morgan | 117—138.8 |
| 3,052,543 | 9/62 | Bauer et al. | 117—138.8 |

WILLIAM D. MARTIN, *Primary Examiner.*

RICHARD D. NEVIUS, MURRAY KATZ, *Examiners.*